US010532940B2

United States Patent
Smith et al.

(10) Patent No.: US 10,532,940 B2
(45) Date of Patent: Jan. 14, 2020

(54) AERATION DISCS AND METHODS FOR USING SAME

(71) Applicant: Evoqua Water Technologies LLC, Warrendale, PA (US)

(72) Inventors: George W. Smith, Pewaukee, WI (US); Mark F. Pamperin, Pewaukee, WI (US); Charles S. Applegate, Brookfield, WI (US); Christopher K. Waul, Waukesha, WI (US); Marc E. Roehl, Mukawongo, WI (US); Michael L. Doyle, Wauwatosa, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 0 days.

(21) Appl. No.: 15/511,284

(22) PCT Filed: Sep. 11, 2015

(86) PCT No.: PCT/US2015/049692
§ 371 (c)(1),
(2) Date: Mar. 15, 2017

(87) PCT Pub. No.: WO2016/044093
PCT Pub. Date: Mar. 24, 2016

(65) Prior Publication Data
US 2018/0111862 A1    Apr. 26, 2018

Related U.S. Application Data

(60) Provisional application No. 62/051,022, filed on Sep. 16, 2014.

(51) Int. Cl.
*C02F 3/18*    (2006.01)
*C02F 3/12*    (2006.01)
(Continued)

(52) U.S. Cl.
CPC ............ *C02F 3/18* (2013.01); *B01F 3/04765* (2013.01); *B01F 7/00466* (2013.01);
(Continued)

(58) Field of Classification Search
CPC .... C02F 3/18; C02F 3/082; C02F 3/16; C02F 3/1257; C02F 3/302; B01F 3/04765;
(Continued)

(56) References Cited

U.S. PATENT DOCUMENTS 3,744,774 A    7/1973 Huisman et al.
3,904,525 A    9/1975 Rosenberg
(Continued)

FOREIGN PATENT DOCUMENTS

CN    2517738 Y    10/2002
EP    0388066 A1    9/1990
WO    2011115972 A1    9/2011

*Primary Examiner* — Claire A Norris

(57) ABSTRACT

Aeration discs used in water treatment and methods of using same are disclosed. According to one or more embodiments, an aeration disc may comprise projections and depressions located on at least one of its surfaces. The aeration discs may be incorporated into aeration devices and water treatment systems.

17 Claims, 10 Drawing Sheets

(51) Int. Cl.
  *B01F 7/00*  (2006.01)
  *B01F 7/10*  (2006.01)
  *C02F 3/30*  (2006.01)
  *B01F 3/04*  (2006.01)

(52) U.S. Cl.
  CPC ...... *B01F 7/00491* (2013.01); *B01F 7/00633* (2013.01); *B01F 7/10* (2013.01); *C02F 3/1257* (2013.01); *C02F 3/302* (2013.01); *B01F 2215/0052* (2013.01); *Y02W 10/15* (2015.05)

(58) Field of Classification Search
  CPC ........ B01F 7/02; B01F 3/04539; B01F 7/004; B01F 7/00475; B01F 7/00466; B01F 7/00491; B01F 7/00633; B01F 7/10
  USPC ................ 210/150, 219, 424.2, 926; 261/92
  See application file for complete search history.

(56) References Cited

U.S. PATENT DOCUMENTS

| | | | |
|---|---|---|---|
| 4,372,895 A * | 2/1983 | Saffran | B01F 3/04765 210/150 |
| 4,399,031 A | 8/1983 | Imano et al. | |
| 4,539,110 A * | 9/1985 | Hardison | B01F 3/04765 210/150 |
| 6,592,762 B2 | 7/2003 | Smith | |

\* cited by examiner

AERATION DISCS AND METHODS FOR USING SAME

CROSS-REFERENCE TO RELATED APPLICATIONS

This application is a U.S. national phase application and claims the benefit of priority under 35 U.S.C. § 371 of International (PCT) Patent Application Serial No. PCT/US2015/049692, titled AERATION DISCS AND METHODS FOR USING SAME and filed on Sep. 11, 2015 which, in turn, claims priority to U.S. Provisional Patent Application Ser. No. 62/051,022, filed on Sep. 16, 2014, titled "METHODS AND APPARATUS FOR THE AERATION OF WASTEWATER" the entire disclosure of which is hereby incorporated herein by reference in its entirety for all purposes.

BACKGROUND

1. Field of the Invention

The present invention relates generally to aerating and mixing a fluid and, more particularly, to aeration discs used in water treatment.

2. Description of Related Art

Aeration of a wastewater stream is a step in many treatment processes. Aeration may be accomplished by rotating a partially-submerged disc, referred to as an aeration disc, through the wastewater.

SUMMARY

According to one or more aspects, an aeration disc is provided. The aeration disc comprises a drive shaft opening, a plurality of projections on a disc surface, and a plurality of depressions on the disc surface, each depression positioned contiguous to one of the plurality of projections.

In accordance with one or more aspects, each of the plurality of projections may comprise a recess defined at a leading portion of the projection. The recess may be semi-cylindrical. Each depression may be positioned contiguous to the leading portion of the projection. The disc surface may have an increased surface area of more than 40%. Each of the plurality of depressions may comprise a tapered leading portion. The aeration disc may further comprise a plurality of dimples on the disc surface. Each of the plurality of projections may comprise a tapered trailing portion. The plurality of projections may be arranged in a series of clusters, each cluster comprising a plurality of rows of projections. The plurality of rows of projections within each cluster may be positioned in a parallel manner Each of the plurality of rows of projections within each cluster may comprise a different number of projections. The clusters may be arranged in a spoke pattern emanating from the drive shaft opening. The drive shaft opening may be a complimentary mating shape to a drive shaft that the drive shaft opening is configured to receive. The aeration disc may comprise two or more joined sections.

According to one or more aspects, an aeration disc is provided that comprises a plurality of projections on a disc surface, each of the plurality of projections comprising a recess defined at a leading portion of the projection.

In accordance with one or more aspects, the recess is semi-cylindrical. The plurality of projections may comprise a tapered trailing portion. The plurality of projections may be arranged in regular patterns on the disc surface. The plurality of projections may be arranged in a series of clusters, each cluster comprising a plurality of rows of projections. The clusters may be arranged in a spoke pattern emanating from the drive shaft opening.

According to one or more aspects, a method of retrofitting an aeration device is provided. The method comprises removing one or more used aeration disc from a drive shaft and securing one or more of the aeration discs as described herein to the drive shaft. The step of securing may comprise placing two of more sections of the one or more aeration discs around the drive shaft and joining the two or more sections together.

In accordance with one or more aspects, an aeration device is provided comprising a motor or gearbox, a drive shaft coupled to the motor or gearbox, and one or more of the disclosed aeration discs.

In accordance with one or more aspects, a wastewater biological treatment system is provided, comprising an oxidation ditch having one or more of the disclosed aeration devices.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed subject matter. Particular references to examples and embodiments, such as "an embodiment," "an example," "one example," "another embodiment," "another example," "some embodiments," "some examples," "other embodiments," "an alternate embodiment," "various embodiments," "one embodiment," "at least one embodiments," "this and other embodiments" or the like, are not necessarily mutually exclusive and are intended to indicate that a particular feature, structure, or characteristic described in connection with the embodiment or example and may be included in that embodiment or example and other embodiments or examples. The appearances of such terms herein are not necessarily all referring to the same embodiment or example.

Furthermore, in the event of inconsistent usages of terms between this document and documents incorporated herein by reference, the term usage in the incorporated references is supplementary to that of this document; for irreconcilable inconsistencies, the term usage in this document controls. In addition, the accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF THE DRAWINGS

The accompanying drawings are not intended to be drawn to scale. In the drawings, each identical or nearly identical component that is illustrated in various figures is represented by like numeral. For purposes of clarity, not every component may be labeled in every drawing. Preferred, non-limiting embodiments will be described with reference to the accompanying drawings, in which.

DETAILED DESCRIPTION

Figure 1:
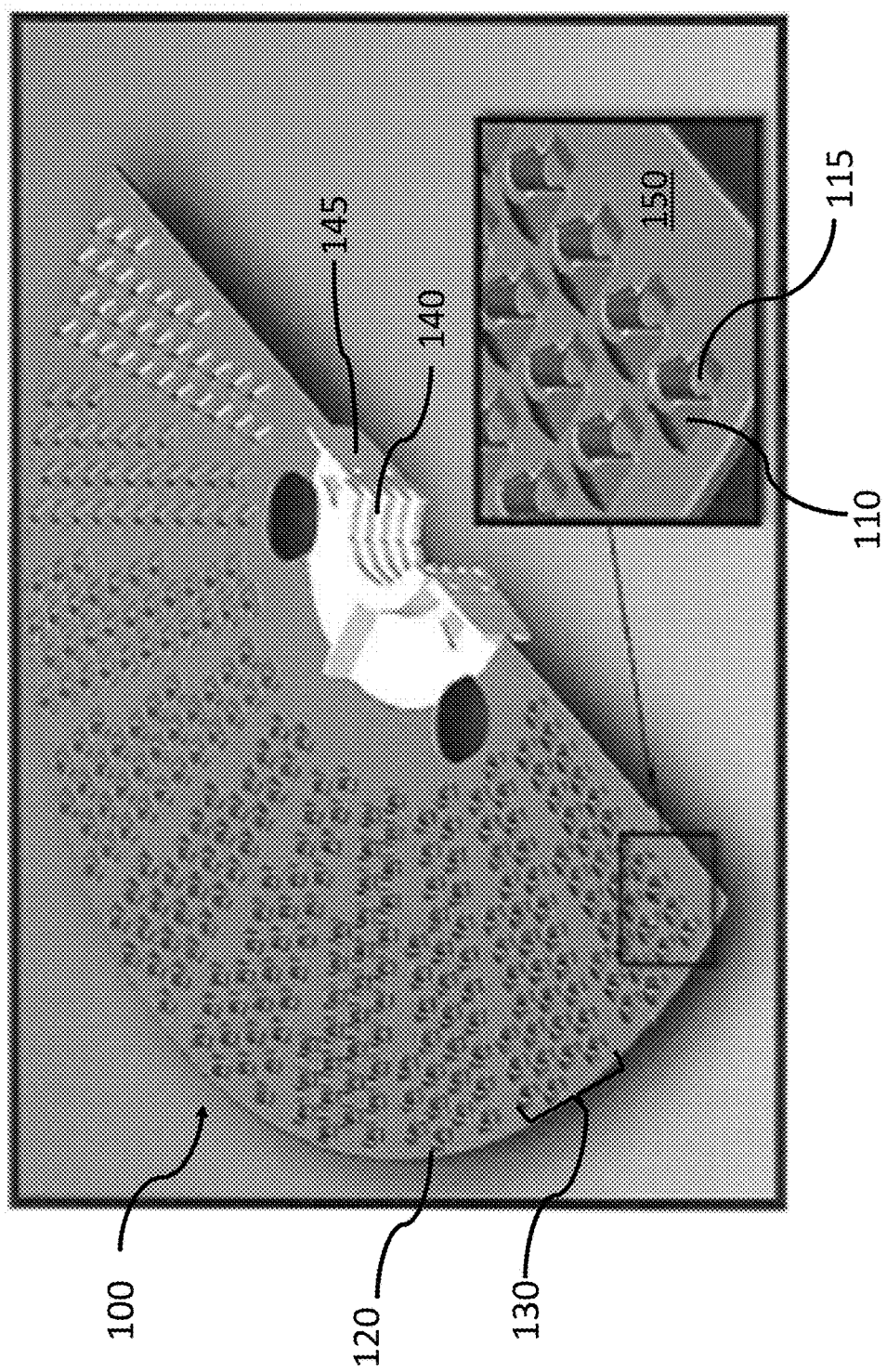
FIG. 1 is an isometric view of a portion of an embodiment of an aeration disc.

According to one or more embodiments, improved aeration discs, aeration devices, and water treatment units/systems comprising aeration discs and/or aeration devices are disclosed. The aeration discs may be used in a variety of applications including the aeration of wastewater (also referred to herein as simply "water" or "liquid"). The aeration discs provide for increased aeration and/or oxygenation efficiency as compared to previously known aeration discs while also providing a more economical device. The aeration disc may be operated by rotating the aeration disc through a body of liquid to be aerated.

According to one or more embodiments, the aeration disc comprises a surface or face having a plurality of projections extending above the plane of the surface. (The projections may alternatively be referred to as nodules or cups.) The projections may function like cups during operation, capturing water and air to aid in aeration of the water as the aeration disc is rotated through it, providing more contact between the water and air and increasing the rate of oxygen transfer into the water from what would be achieved in the absence of the aeration disc. The projections are arranged on the surface of the aeration disc such that when the projections move through and exit the liquid they entrain/disturb an increased volume of liquid as compared to previously known aeration discs, thus enhancing the aeration capacity.

In some embodiments, one or more, substantially all, or all of the projections comprise recesses. The recesses facilitate cup-like operation of the projections. In some embodiments, the recesses are formed in leading portions of the projections, the portions of the projections which first emerge from the water as the aeration disc is rotated during operation. The recesses may be rounded. The recesses may have semi-cylindrical shapes with axes extending perpendicular to the plane of the face of the aeration disc. In operation, as the projections exit the water during rotation, a portion of the water fills the recesses and is lifted out from the surface of the water. The lifted water then falls back into the body of the water. These actions aid in the aeration of the water.

The recesses increase the surface area of the projections and the volume of liquid that can be entrained by the projections, thus increasing the oxygenation efficiency of the aeration disc as compared to an aeration disc without projections and/or recesses. Aeration discs including projections having recesses as disclosed herein provide better air/water mixing and aeration as compared to aeration discs including projections having flat leading portions.

The projections may further comprise a taper on the trailing portions of the projections, the portions last to exit from the water during rotation of the aeration disc through the water. These tapered portions may extend from the highest points of the projections to the surface of the aeration disc. The tapers may facilitate detangling of solids, for example, hair, rags, or paper, from the projections to prevent or reduce fouling of the aeration disc. When viewed from the side, the leading portions and tapered trailing portions may form half-trapezoidal shapes on side surfaces of the projections in a plane perpendicular to the aeration disc surface.

According to one or more embodiments, a depression (alternatively referred to as a gouge or indent) is placed contiguous to each projection to create a greater effective projection height (along a dimension perpendicular to the aeration disc surface) without adding more material to the aeration disc. The depressions may be contiguous to the leading portions of the projections. The depressions may have their own leading portions and trailing portions. The leading portions of the recesses may be tapered with first ends at a level even with the general surface of the aeration disc and second ends at a depth of the trailing portions of the depressions. The trailing portions of the depressions together with the recesses in the projections may form void volumes in which liquid is entrained during operation. When viewing the surface from above, the trailing portions of the depressions may have the same general shape as the recesses.

Figure 7:
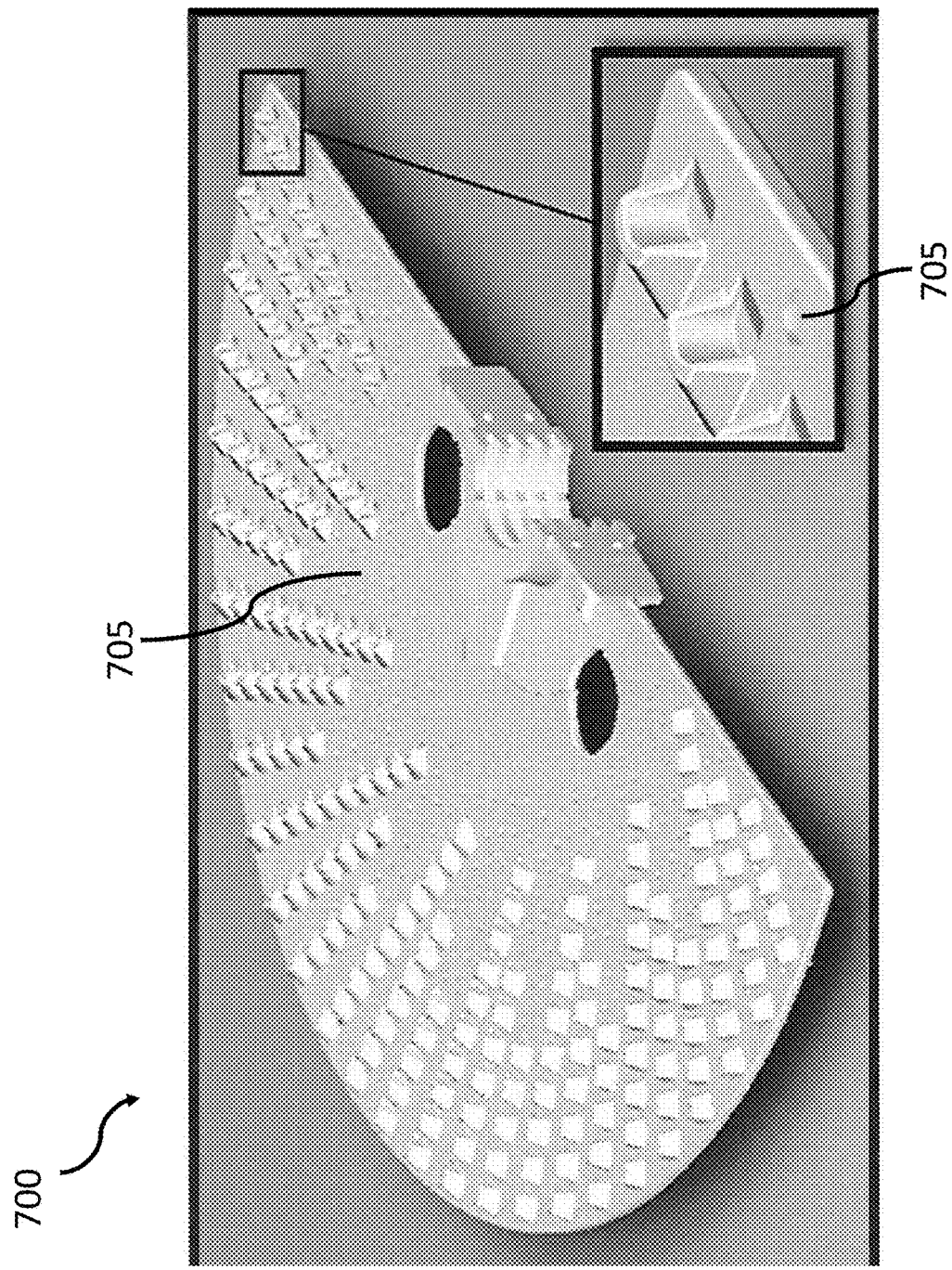
FIG. 7 is an isometric view of a portion of an embodiment of an aeration disc.

In another embodiment the surface of the disc may include dimples, separate from the depressions discussed above, to further increase the oxygen transfer rate. One embodiment of dimples 705 in an aeration disc 700 is shown in FIG. 7. Dimples 705 comprise substantially cylindrical recesses extending into the body of the aeration disc 700. Dimples 705 may have axes perpendicular to a plane defined by the surface of the aeration disc 700. The dimples 705 may occupy portions of the aeration disc 700 not occupied by the clusters 130 of projections 110.

The projections may be arranged in regular patterns on the surface of the disc. The projections may be arranged in rows on the face of the aeration disc, with rows segregated into clusters of rows. The pattern of rows and projections in each cluster may be repeated around the disc to form a plurality of clusters. Each row of a cluster may comprise a different number of projections. The rows in a cluster may be arranged in parallel. The clusters may be arranged in a spoke pattern emanating from a central drive shaft opening.

The aeration disc may further comprise a drive shaft opening. The drive shaft opening may have a mating configuration configured to compliment a drive shaft mating configuration. The opening may be positioned at a central portion of the aeration disc. The aeration disc may be coupled and secured to a drive shaft at the opening. The drive shaft may comprise a drive shaft collar to aid in coupling the drive shaft to the aeration disc at the drive shaft opening of the disc. The portion of the aeration disc defining the drive shaft opening may be referred to as an attachment point.

According to one or more embodiments, the fabricated aeration disc can have an attachment point that comprises one or more flat spots to engage a drive shaft. The drive shaft is coupled to a motor or other means of mechanically rotating the aeration disc. By using flat spots in the area where the aeration disc engages the drive shaft, the requirement for a tight fitting shaft collar is reduced, which saves weight and cost. Such an embodiment may further reduce tolerances required for a tight clearance between the aeration disc and the drive shaft, by changing the shape of the drive shaft to bear the torque in a specific location on the aeration disc instead of distribution through equal contact.

The presence of projections, depressions, and/or recesses on the surface of the disc results in an increased surface area of the disc. The increased surface area may be defined as the percentage by which the surface area of the new disc is greater than the surface area of a flat disc of the same diameter. According to some embodiments, the aeration disc has an increased surface area of about 40% or more.

Figure 2:
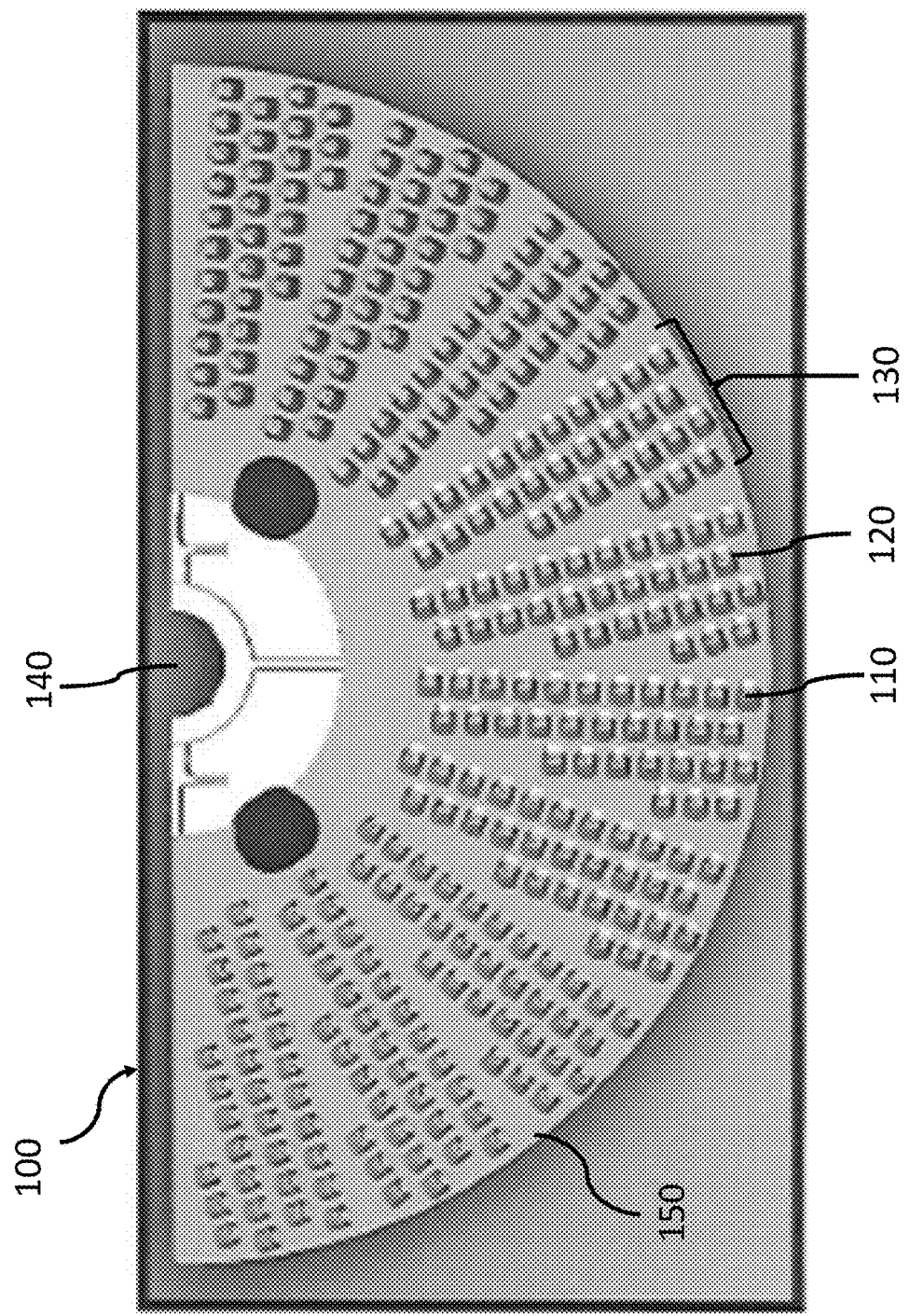
FIG. 2 is a plan view of the portion of the aeration disc of FIG. 1.
Figure 3:
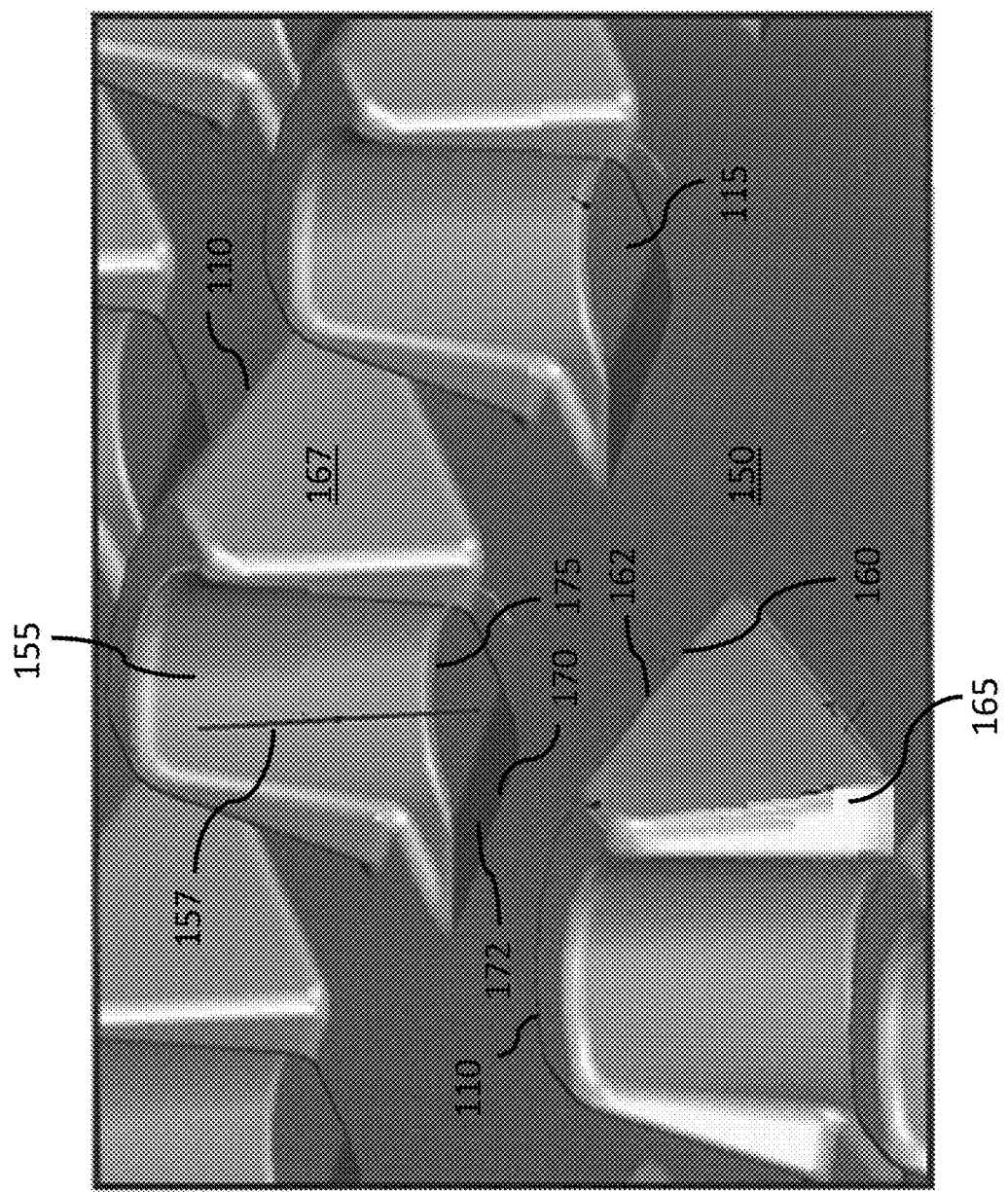
FIG. 3 is an enlarged view of a portion of the surface of the aeration disc of FIG. 1.

Turning to the figures, FIGS. 1-3 show an improved aeration disc 100 having projections 110, recesses 155 defined in the projections 110, and depressions 115 (only one half of the aeration disc is shown). The projections 110 rise above the plane defined by the aeration disc surface 150, while the depressions 115 fall below it. The projections 110 are arranged in rows 120, the rows forming repeating clusters 130. At a central portion of the aeration disc 100 is a drive shaft opening 140 for engaging a drive shaft to cause rotation during operation, surrounded by a disc hub 145.

As shown in FIG. 3, which provides a detailed view of a portion of the surface 150 of the aeration disc 100, the projections 110 each have a recess 155 that is semi-cylindrical, having an axis indicated at 157. In some embodiments, the axes 157 are perpendicular to a plane defined by the surface 150 of the aeration disc 100. The projections 110 have leading portions 165, which exit the liquid first during operation, and trailing portions 160 with tapered backs 162. The side surfaces 167 of the projections 110 have a half-trapezoidal shape.

Each projection 110 is contiguous with a depression 115 which serves to effectively increase the volume of water entrained during operation. The depressions 115, themselves, also comprise leading portions 170, which include tapers 172, and trailing portions 175 abutting the front, or leading portions, of the projections 110.

In the embodiment shown in FIGS. 1-3, the projections 110 are placed in a repeating pattern of four rows 120. Each row is of a different length. The longest row 120 has 11 projections 110, the second has ten, the third has seven, and the fourth has three. This pattern repeats itself ten times (for half of an aeration disc 100) to form ten clusters 130. The longest row of each cluster 130 is oriented perpendicular to the edge of the aeration disc at the point on the edge of the aeration disc closest to the end of the longest row. All rows 120 in a cluster 130 are parallel, resulting in clusters 130 emanating from the drive shaft opening 140 in a spoke pattern. Additionally, the rows 120 of projections 110 are offset from one another; the projections in the second row of projections 110 are placed in behind and between corresponding projections in the first row 120. Embodiments of the invention are not limited to these specific numbers of rows and projections.

Figure 6:
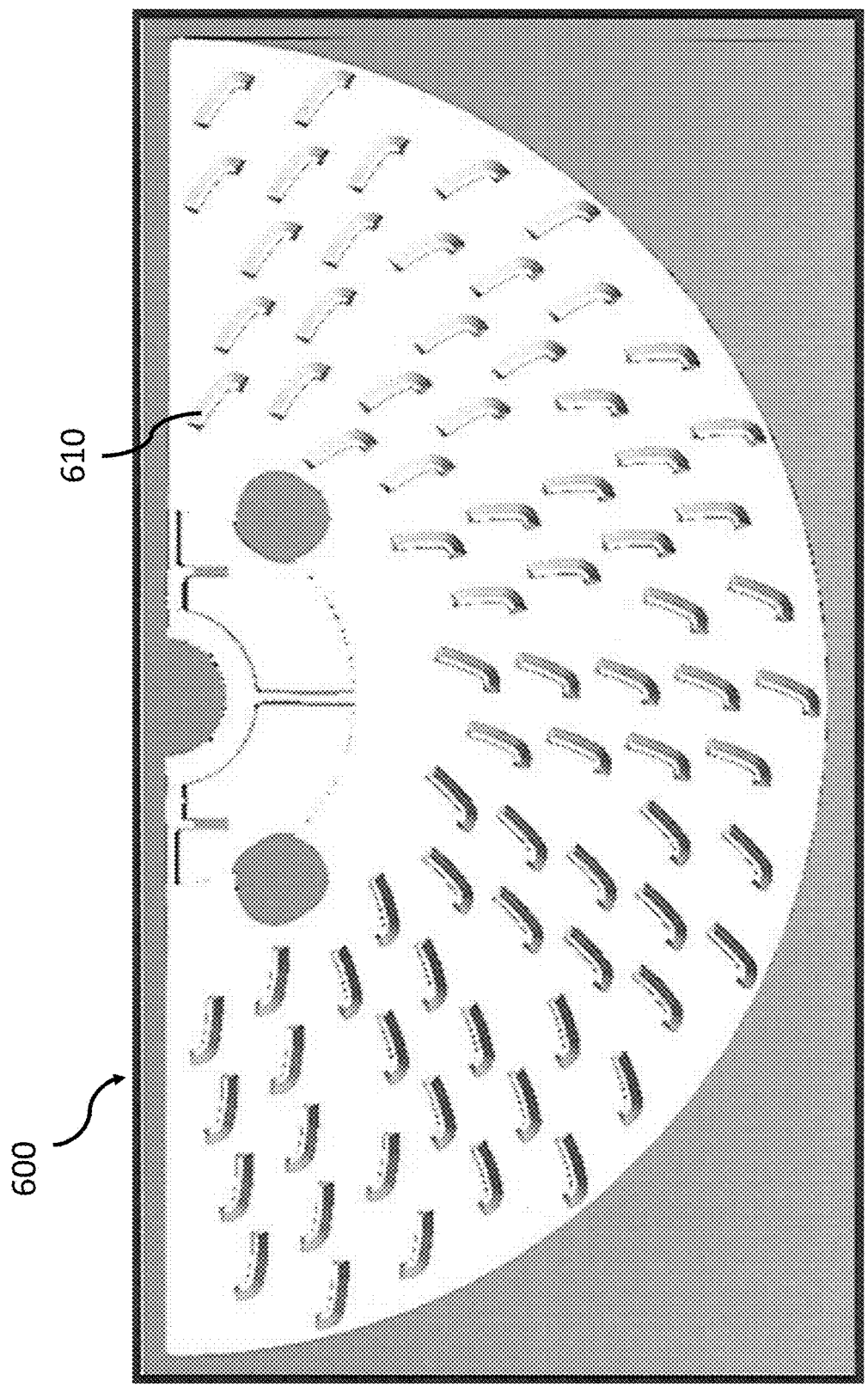
FIG. 6 is a plan view of a portion of an embodiment of an aeration disc.

Alternative shapes for projections may include "J" or hook-shaped projections, for example, the J-shaped projections 610 of the aeration disc 600 shown in FIG. 6.

The projections may be arranged so water cascades from one projection to another to further improve oxygen transfer.

According to one or more embodiments, dimensions of the projections and recesses for the embodiment shown in FIGS. 1-3 are as follows:

TABLE 1

| Projection Dimensions | |
|---|---|
| Height | 0.688 inches |
| Width of Top | 0.25 inches |
| Width of Bottom | 1.25 inches |
| Length of Top | 0.905 inches |
| Length of Bottom | 1.35 inches |

TABLE 2

| Recess Dimensions | |
|---|---|
| Diameter | 0.75 inches |
| Distance from bottom to disc surface plane | 0.15 inches |
| Distance from bottom of recess to top of projection | 0.838 inches |

The diameter of the aeration disc of this embodiment is 66 inches, while the distance between the projections in the same row is 0.41 inches. Embodiments of the invention are not limited to these specific dimensions.

Various manufacturing methods may be used to fabricate the aeration disc. These fabrication methods include machining, injection molding, and vacuum forming or molding.

Figure 4:
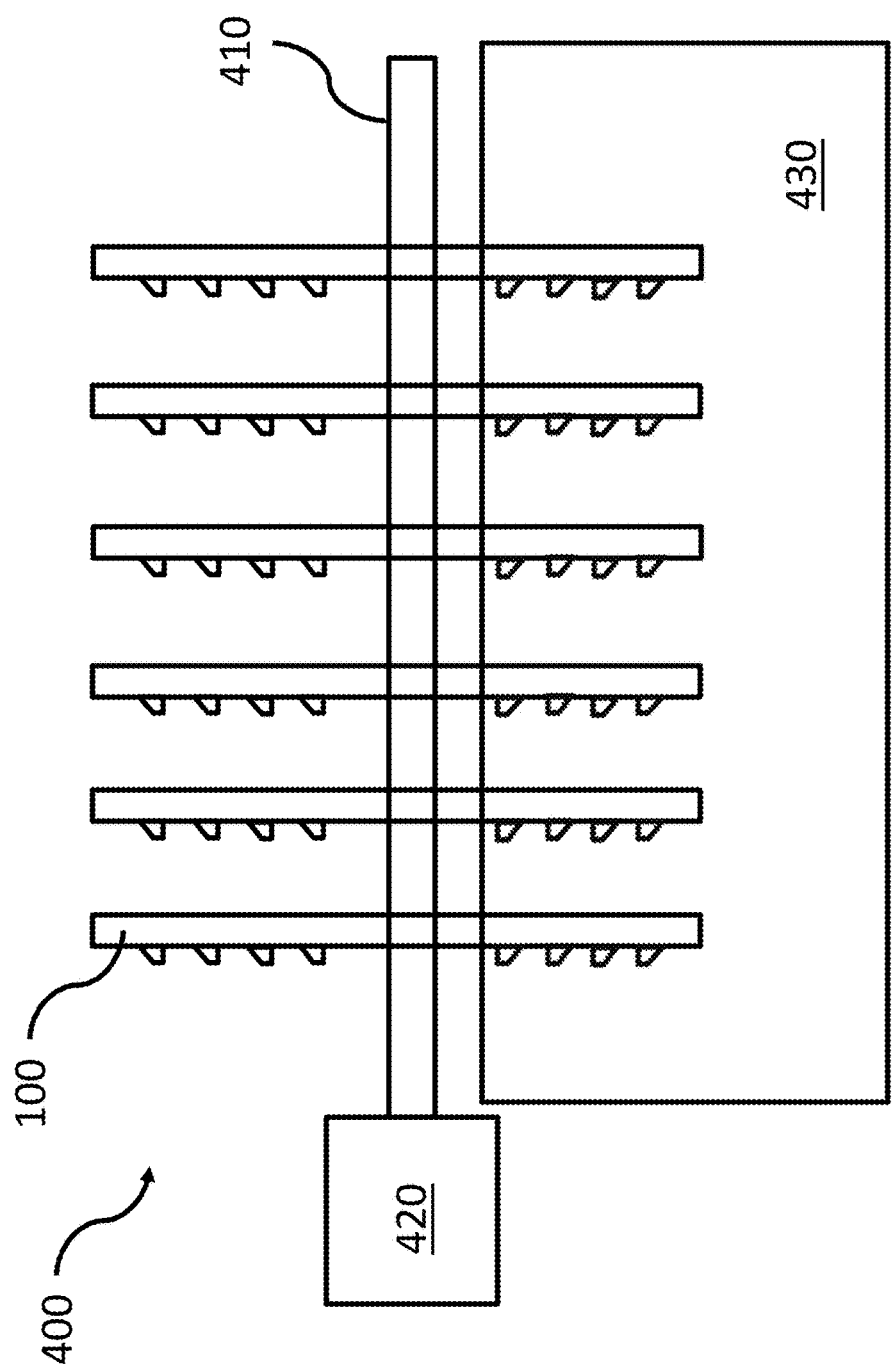
FIG. 4 is a system diagram of an aeration device according to one or more embodiments.

As shown in FIG. 4, according to one or more embodiments, one or more aeration discs 100 may be incorporated into an aeration device 400 for aerating a liquid 430 undergoing treatment. For example, as shown in FIG. 4, a plurality of aeration discs 100 are coupled to a drive shaft 410 powered by a motor/gearbox 420. The aeration discs are rotated through the liquid 430, aerating the liquid 430.

Aeration discs may be coupled to the drive shaft in a variety of manners. For example, an aeration disc may be placed through the drive shaft at one end and guided along the drive shaft until its final position is reached, at which point it may be secured to the drive shaft. The process may be repeated for a plurality of aeration discs until all are in position, forming an aeration device.

Alternatively, the aeration disc may comprise two halves (or any number of sections) that are positioned around the drive shaft at their designated position along the drive shaft and joined and secured to each other and/or the drive shaft. This process may be repeated for a plurality of aeration discs along a drive shaft.

According to one or more embodiments, one or more of the disclosed aeration discs and/or aeration devices may be incorporated into a wastewater treatment system. For example, the aeration discs and/or aeration devices may be incorporated into a biological treatment system. The biological treatment system may comprise an activated sludge process. The biological treatment system may comprise a nitrification-denitrification process. The biological treatment system may comprise a simultaneous nitrification-denitrification process. The aeration discs and/or aeration devices may be disposed in an oxidation ditch as part of the biological treatment process. The oxidation ditch may comprise one or more channels carrying liquid to be treated at one or more stages of treatment. The improved aeration provided by the aeration discs allows for improved efficiencies and savings with regard to the manufacturing of the discs because the increased aeration capabilities allow for an equivalent amount of aeration using fewer discs compared to known systems. The improved aeration discs also allow for synergistic improvements to the designs and efficiencies of the entire biological treatment system. For example, the improved aeration capabilities of the disc, in association with an increased disc diameter, allow for an increased depth of aeration which, in turn, allows for treatment channels to be deeper, thereby decreasing the required footprint of the entire treatment system for a given volume of wastewater.

The discs may be operated in any number of water treatment processes that call for aeration. One contemplated application for the aeration discs is to aid in ammonia removal from water. During an ammonia removal process, a wastewater is initially aerated by means of one or more of the disclosed discs to provide oxygen to encourage certain microorganisms to grow and convert ammonia to nitrate. Next aeration is reduced so that microorganisms will utilize the oxygen in the nitrate which results in nitrogen gas to be formed. Finally, aeration is used to purge the nitrogen from the wastewater.

Figure 5:
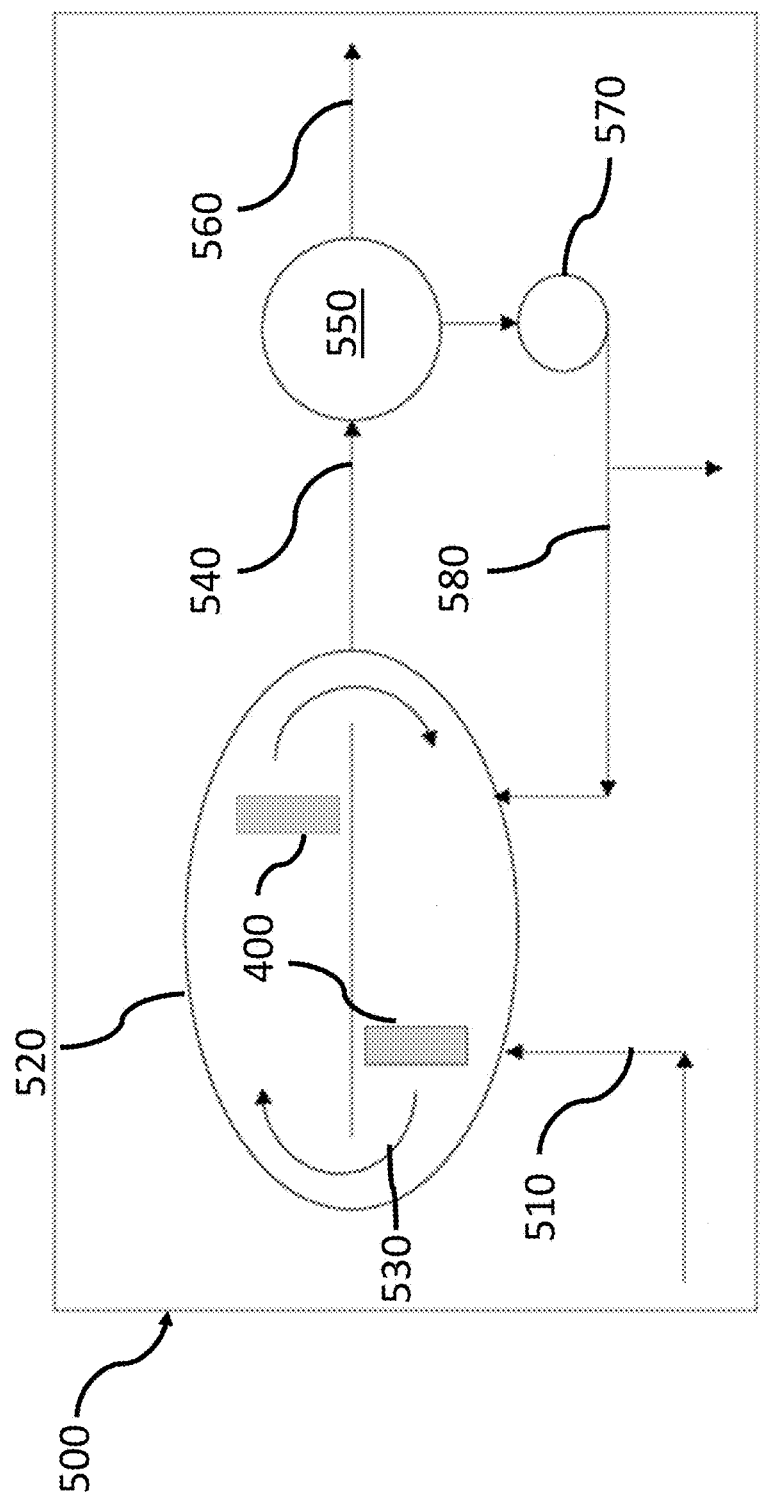
FIG. 5 is a system diagram of an activated sludge treatment system according to one or more embodiments.

An activated sludge treatment system 500 is shown in FIG. 5. The disclosed aeration devices 400 may be incorporated into an oxidation ditch treatment unit 520 within the system 500. In the treatment system 500 a liquid is received into an oxidation ditch 520 via a conduit 510. While in the oxidation ditch 520, the liquid travels along one or more channels 530 where it undergoes biological treatment. While traveling in at least one of the one or more channels 530, the liquid is subject to aeration from the aeration devices 400. Treated liquid exits the oxidation ditch 520 via a conduit 540. It then undergoes separation at a clarifier 550. A liquid portion is delivered along a conduit 560, while a portion of sludge is returned to the oxidation ditch 520 as return activated sludge via a pump 570 and a conduit 580.

The invention also contemplates the modification of existing systems/facilities and aeration devices to retrofit one or more aeration discs, or components to implement the techniques and improvements of the invention. For example, an existing aeration device may have its current aeration discs removed and replaced with an aeration disc as disclosed herein according to one or more of the methods of assembly discussed above.

In operation, one or more aeration discs, positioned on a drive shaft and partially submerged in a liquid to be aerated, are rotated through a liquid to be aerated. The above-described designs of projections, recesses, and/or dimples move through and exit the liquid thereby entraining and disturbing a volume of liquid and air to aerate the water.

The function and advantages of these and other embodiments of the present invention will be more fully understood from the following examples. These examples are intended to be illustrative in nature and are not considered to limit the scope of the invention.

EXAMPLE

Pilot tests were conducted to compare the efficacy of various embodiments of aeration discs. Test performance was in accordance with ANSI/ASCE-2-91, Standard for the Measurement of Oxygen Transfer in Clean Water, $2^{nd}$ ed. and Standard Methods for the Examination of Water and Wastewater, $20^{th}$ ed. Known discs having no depression associated with a projection and five modified aeration discs, according to one or more embodiments, were evaluated at different immersion depths and rotation speeds in a 9,000 gallon tank. Two of the tested discs had a 54" diameter and the remaining four discs had a 66" diameter. The projection shape, pattern and size varied between each of the tested discs. The dissolved oxygen (DO) data was gathered using 3 YSI multi meters with DO probes. The data was analyzed using the ACSE spreadsheet to quantify the standard oxygen transfer rate (SOTR) and the standard aeration efficiency (SAE). Results comparing a known disc having a 54" diameter to the embodiment shown in FIGS. 1-3 having a 66" diameter are re-produced below.

TABLE 3

SOTR Results from the 54" Standard Known Aeration Disc and 66" Improved Disc

| Speed (RPM) | Standard disc immersion (inches) | Improved Disc immersion (inches) | Std. Disc SOTR (lb O$_2$/hr) | Improved Disc SOTR (lb O$_2$/hr) | Ratio of Improved Disc SOTR to Std. Disc SOTR |
|---|---|---|---|---|---|
| 29 | 15 | 21 | 0.392 | 0.854 | 2.18 |
| 43 | 15 | 21 | 1.017 | 2.336 | 2.3 |
| 50 | 15 | 21 | 1.439 | 3.343 | 2.32 |
| 29 | 18 | 24 | 0.432 | 0.913 | 2.11 |
| 43 | 18 | 24 | 1.136 | 2.621 | 2.31 |
| 50 | 18 | 24 | 1.661 | 3.832 | 2.31 |
| 29 | 21 | 27 | 0.525 | 1.031 | 1.96 |
| 43 | 21 | 27 | 1.375 | 2.782 | 2.02 |
| 50 | 21 | 27 | 1.968 | 4.301 | 2.19 |

Table 3 indicates that for various operating speeds (in rotations per minute) and various immersion depths (depth beneath the surface of the aerated water of the lowest point of the disc), the disclosed improved disc consistently transferred oxygen at twice the rate of the standard disc as shown in the final column of the table.

TABLE 4

SAE Results from the 54" Standard Known Aeration Disc and 66" Improved Disc

| Speed (RPM) | Std. disc immersion (inches) | Improved Disc immersion (inches) | Std. Disc SAE (lb O$_2$/bHp/hr) | Improved Disc SAE (lb O$_2$/bHp/hr) | Ratio of Improved Disc SAE to Std. Disc SAE |
|---|---|---|---|---|---|
| 29 | 15 | 21 | 4.66 | 4.51 | 0.97 |
| 43 | 15 | 21 | 2.6 | 2.75 | 1.06 |
| 50 | 15 | 21 | 2.3 | 2.44 | 1.06 |
| 29 | 18 | 24 | 4.35 | 3.91 | 0.9 |
| 43 | 18 | 24 | 2.49 | 2.67 | 1.07 |
| 50 | 18 | 24 | 2.29 | 2.45 | 1.07 |
| 29 | 21 | 27 | 4.37 | 3.78 | 0.86 |
| 43 | 21 | 27 | 2.53 | 2.54 | 1.01 |
| 50 | 21 | 27 | 2.26 | 2.42 | 1.07 |

Table 4 indicates the SAE of the standard disc and disclosed disc under the same conditions as the previous table. The table indicates that the improved disc is able to transfer the same amount of oxygen per unit of power as the known standard disc. The improved disc is therefore able to increase the oxygen transfer rate without a loss in efficiency from a power standpoint.

The results indicate that according to one or more disclosed embodiments, an improved aeration disc is capable of transferring oxygen to water at twice the rate of a conventional disc. By having one disc capable of performing the oxygen transfer of two standard prior art discs, the system is able to operate more efficiently, with overall manufacturing costs reduced, and system footprint reduced.

Figure 8:
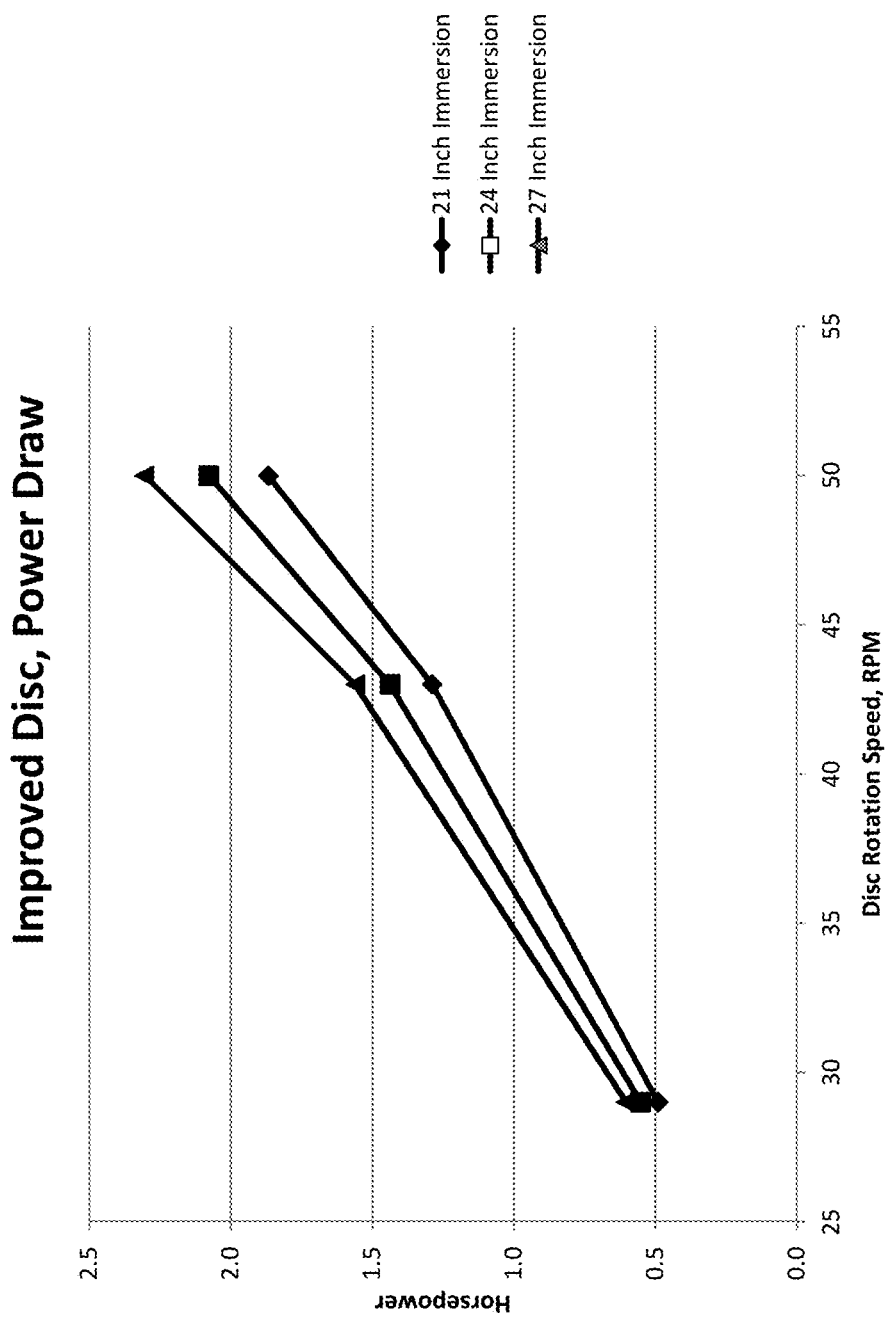
FIG. 8 is a graph of test results of a test indicating the performance of an aeration disc according to one or more embodiments.
Figure 9:
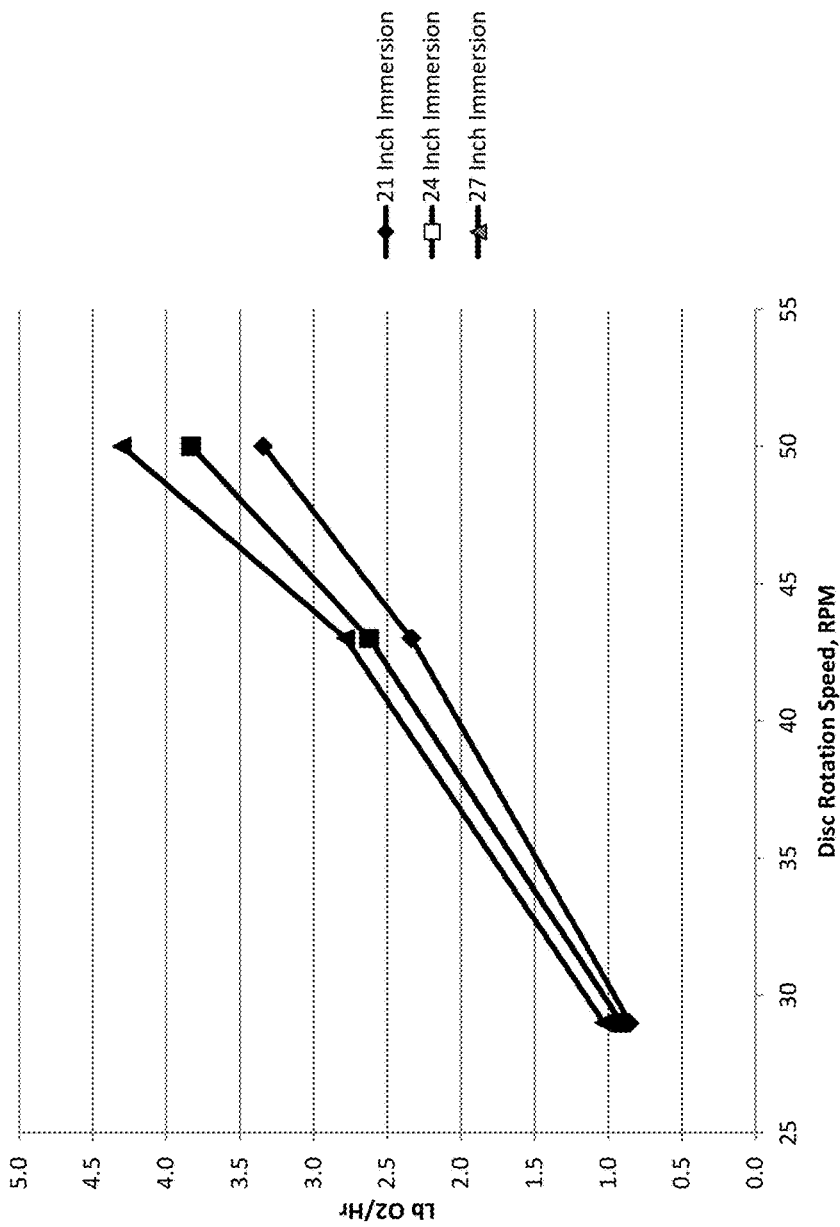
FIG. 9 is a graph of test results of another test indicating the performance of an aeration disc according to one or more embodiments.
Figure 10:
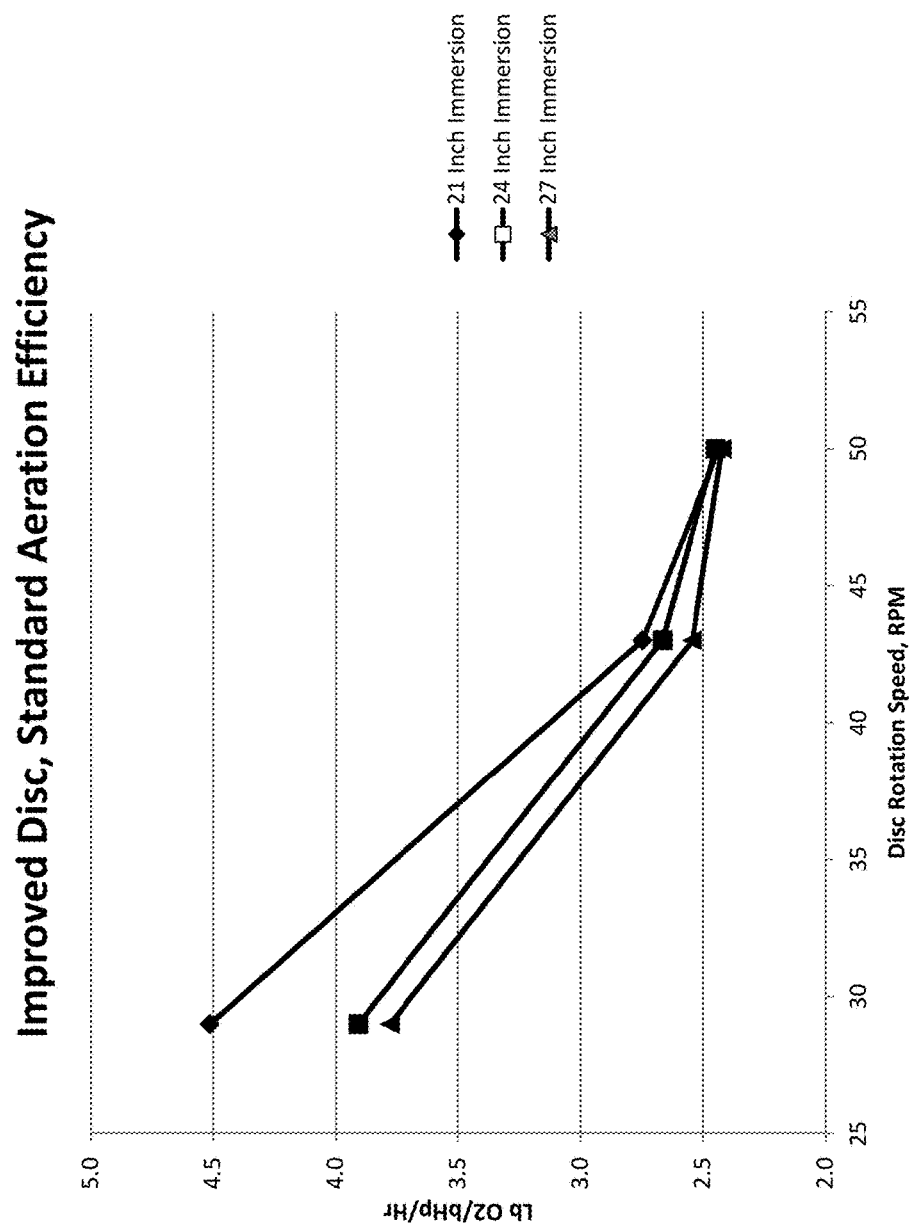
FIG. 10 is a graph of test results of another test indicating the performance of an aeration disc according to one or more embodiments.

FIGS. 8-10 show various results for the improved disc at different rotation speeds and immersion depths. As shown in FIG. 8, power requirements increase as the immersion depths and rotation speeds increase. As shown in FIG. 9, the oxygen transfer rate increases as the immersion depths and rotation speeds increase. As shown in FIG. 10, the standard aeration efficiency decreases as the immersion depths and rotation speeds increase, however at a rotation speed of 50 RPM, the efficiency is similar regardless of the immersion depth.

Having now described some illustrative embodiments, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

It is to be appreciated that embodiments of the devices, systems and methods discussed herein are not limited in application to the details of construction and the arrangement of components set forth in the description or illustrated in the accompanying drawings. The devices, systems and methods are capable of implementation in other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is therefore to be understood that the embodiments described herein are presented by way of example only and that, within the scope of the appended claims and equivalents thereto the invention may be practiced otherwise than as specifically described.

Moreover, it should also be appreciated that the invention is directed to each feature, system, subsystem, or technique described herein and any combination of two or more features, systems, subsystems, or techniques described herein and any combination of two or more features, systems, subsystems, and/or methods, if such features, systems, subsystems, and techniques are not mutually inconsistent, is considered to be within the scope of the invention as embodied in the claims. Further, acts, elements, and features discussed only in connection with one embodiment are not intended to be excluded from a similar role in other embodiments.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element, nor the order of elements presented, does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. An aeration disc, comprising:
   a drive shaft opening;
   a plurality of projections on a disc surface, each of the plurality of projections defining a recess in a leading portion to facilitate cup-like operation and comprising a tapered trailing portion, the plurality of projections being arranged in a series of clusters on the disc surface in a spoke pattern emanating from the drive shaft opening with each cluster comprising a plurality of rows of projections positioned in a parallel manner; and
   a plurality of depressions on the disc surface, each of the plurality of depressions comprising a tapered leading portion and a trailing portion,
   wherein each depression is positioned contiguous to the leading portion of one of the plurality of projections to increase an effective projection height, and wherein each depression and its corresponding projection forms a void volume in which liquid is entrained during operation.

2. The aeration disc of claim 1, wherein the recesses are semi cylindrical.

3. The aeration disc of claim 1, wherein the disc surface has an increased surface area of more than 40% in comparison to an aeration disc without the contiguous projections and depressions positioned on the disc surface.

4. The aeration disc of claim 1, further comprising a plurality of dimples in the disc surface.

5. The aeration disc of claim 1, wherein each of the plurality of rows of projections within each cluster comprises a different number of projections.

6. The aeration disc of claim 1, wherein the drive shaft opening has a complimentary mating shape to a drive shaft that the drive shaft opening is configured to receive.

7. The aeration disc of claim 1, wherein the aeration disc comprises two or more sections joined to form the aeration disc.

8. The aeration disc of claim 1, wherein the projections have tapered backs.

9. The aeration disc of claim 1, wherein side surfaces of the projections have a half-trapezoidal shape.

10. The aeration disc of claim 1, wherein the projections are placed in a repeating pattern of four rows.

11. The aeration disc of claim 5, wherein the longest row of each cluster is oriented perpendicular to the edge of the aeration disc at the point on the edge of the aeration disc closest to the end of the longest row.

12. The aeration disc of claim 5, wherein the cluster is repeated ten times over half of an aeration disc.

13. The aeration disc of claim 5, wherein the projections are offset among adjacent rows.

14. A method of retrofitting an aeration device, comprising:
   removing one or more used aeration discs from a drive shaft; and
   securing one or more of the aeration discs of claim 1 to the drive shaft.

15. The method of claim 14, wherein securing further comprises placing two of more sections of the one or more aeration discs around the drive shaft and joining the two or more sections together to form the one or more aeration discs.

16. An aeration device, comprising:
   a motor or gearbox;
   a drive shaft coupled to the motor or gearbox; and
   one or more of the aeration discs of claim 1 secured to the drive shaft.

17. A wastewater biological treatment system, comprising an oxidation ditch having one or more of the aeration devices disclosed in claim 16.

* * * * *